US009928267B2

(12) United States Patent
Raman et al.

(10) Patent No.: US 9,928,267 B2
(45) Date of Patent: Mar. 27, 2018

(54) HIERARCHICAL DATABASE COMPRESSION AND QUERY PROCESSING (71) Applicant: International Business Machines Corporation, Armonk, NY (US)

(72) Inventors: Vijayshankar Raman, Cupertino, CA (US); Richard S. Sidle, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 471 days.

(21) Appl. No.: 14/304,211

(22) Filed: Jun. 13, 2014

(65) Prior Publication Data
US 2015/0363456 A1 Dec. 17, 2015

(51) Int. Cl.
*G06F 17/30* (2006.01)
(52) U.S. Cl.
CPC .. *G06F 17/30371* (2013.01); *G06F 17/30153* (2013.01); *G06F 17/30221* (2013.01); *G06F 17/30589* (2013.01)
(58) Field of Classification Search
CPC ......... G06F 17/30371; G06F 17/30221; G06F 17/30153; G06F 17/30589
See application file for complete search history.

(56) References Cited

U.S. PATENT DOCUMENTS

| 6,006,232 | A | 12/1999 | Lyons |
| 7,143,046 | B2 | 11/2006 | Babu et al. |
| 8,838,551 | B2 | 9/2014 | Fanghaenel et al. |
| 2009/0006399 | A1* | 1/2009 | Raman .............. G06F 17/30498 |
| 2009/0198716 | A1 | 8/2009 | Howarth et al. |
| 2010/0030796 | A1* | 2/2010 | Netz ................. G06F 17/30501 707/756 |
| 2012/0117064 | A1* | 5/2012 | Draese ............. G06F 17/30592 707/737 |
| 2012/0296881 | A1 | 11/2012 | Christian et al. |
| 2012/0323929 | A1 | 12/2012 | Kimura et al. |

(Continued)

FOREIGN PATENT DOCUMENTS

CN 101996250 A 3/2011
WO WO2009001174 A1 12/2008

OTHER PUBLICATIONS

H. Huang, et al., "Lossless Semantic Compression for Relational Databases," Thesis, Simon Fraser University, Nov. 2001; pp. 1-71.

(Continued)

*Primary Examiner* — Kristopher Andersen
(74) *Attorney, Agent, or Firm* — Cantor Colburn LLP; Bryan Butler (57) ABSTRACT Embodiments relate to hierarchical database compression. An aspect includes applying a first level of a first type of compression to a first partition of a column of a database. Another aspect includes applying a second level of the first type of compression to a subset of the first partition, wherein the first level of the first type of compression comprises a first first-level dictionary and the second level of the first type of compression comprises a first second-level dictionary, and wherein a code size of the first first-level dictionary is larger than a code size of the first second-level dictionary.

15 Claims, 7 Drawing Sheets

300

(56) References Cited

U.S. PATENT DOCUMENTS

2013/0060780 A1     3/2013   Lahiri et al.
2015/0178305 A1     6/2015   Mueller et al.

OTHER PUBLICATIONS

V. Raman, et al., "How to Wring a Table Dry: Entropy Compression of Relations and Querying of Compressed Relations," Proceedings of the 32nd International Conference on Very Large Data Bases, VLDB Endowment, ACM, 2006, pp. 858-869.

G. Ray, et al., "Database Compression: A Performance Enhancement Tool," International Conference on Management of Data, 1995; pp. 1-20.

R. Toofanny, et al., "Implementation of 3D Spatial Indexing and Compression in a Large-Scale Molecular Dynamics Simulation Database for Rapid Atomic Contact Detection," BMC Bioinformatics, 2011, 12:334, Aug. 10, 2011; pp. 1-11.

* cited by examiner

ORIGIN COUNTRY FIRST-LEVEL DICTIONARY
104

000000 = AU
000001 = CA
000010 = IT
000011 = MX
........
111111 = ZA

ORIGIN COUNTRY SECOND-LEVEL DICTIONARY
105

HIERARCHICAL DATABASE COMPRESSION AND QUERY PROCESSING

BACKGROUND

The present disclosure relates generally to database compression, and more specifically, to hierarchical database compression and query processing.

A database is made up of data that is organized into tables; all entries within a table have the same set of one or more columns. Within a table, the data entries are further subdivided into pages, which have a set maximum page size. Data entries are added to a database system through bulk load operations and (typically) smaller insert, or update, operations, e.g., using the structured query language (SQL) insert statement. In both cases, the input data are converted into the native format of the database, and compression techniques are applied to the data to reduce its size, and finally the compressed data is stored in fixed size units, or pages, of the database system. Compression techniques are important to reduce consumption of resources, such as disk space and network bandwidth. Compression techniques are applied in a database system to improve disk space savings and query performance. Database compression techniques are generally applied to a single level of granularity of database objects, e.g., table, row, column, or page.

BRIEF SUMMARY

Embodiments include a method, system, and computer program product for hierarchical database compression. An aspect includes applying a first level of a first type of compression to a first partition of a column of a database. Another aspect includes applying a second level of the first type of compression to a subset of the first partition, wherein the first level of the first type of compression comprises a first first-level dictionary and the second level of the first type of compression comprises a first second-level dictionary, and wherein a code size of the first first-level dictionary is larger than a code size of the first second-level dictionary.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to hierarchical database compression and query processing. A database that implements hierarchical compression that combines first-level (for example, column-level) and second-level (for example, page-level) compression exploits clustering to improve compression while also, at the same time preserving the ability to perform query evaluation on compressed data. A first-level compression scheme is applied to a first level of data in a database, which may be a column or a partition of a column in some embodiments, and additional second-level compression is applied, based on determining that the additional second-level compression is beneficial, to the data that resides within a given subset of the column. The subset may comprise a page or set of contiguous pages in some embodiments. Using the same compression scheme (e.g., dictionary coding or minus coding) at both levels for any given partition enables efficient query processing directly on the compressed data. The additional second-level compression may be determined and applied when data is added to the database, for example, by a bulk load or an insert/update operation.

Data values are often clustered locally within an input data set, meaning that the same or similar values occur close together within that data set. This clustering is naturally retained at the page level within the database as data entries are loaded or inserted because operations typically append data to new pages that are added at the end of the database tables. Some attributes or columns of input data may be clustered by the time of creation; for example, in a database table that contains sales data, a given page contains transactions that occurred at around the same date and time. As such, the values in a transaction date column of the sales table are likely to be clustered.

Storage savings achieved by data compression are improved by taking this clustering into account. In the sales data example, if a given page of the table contains transactions for a single date, the sales date may be recorded once within that page to indicate that all records in that page share that same date. If the page contains transactions for only two dates, each of those dates may be recorded once in the page, and a one bit code may then be inserted in each record of the page, where a code value of 0 means that the record is for the first date and a code value of 1 means the record is for the second date. In this way, the date storage is reduced to one bit per record plus a small dictionary for the entire page that contains the two full date values.

Dictionary coding may be applied across an entire sales table using a dictionary at the table level that contains all values that are present in the sales date column. If the table contains three year's of sales transactions, a 10 bit code may be used to compress the sales date column (e.g., ceiling($\log_2$(265*3))=10 bits). By using a combination of a first-level dictionary (i.e. table-level) that is applied to all of the data in the table and optional second-level dictionaries for the values that are frequent within a given page or set of contiguous pages, better compression may be achieved, as this combination exploits local clustering of data within the pages.

The compression that is applied to the data of a database system must be undone during query processing that retrieves and processes the data. This decoding of the compressed data requires more processing time and memory space, as the processed data values require more space after decompression. The query processing is performed directly on compressed data, deferring the decompression as late as possible in the query processing, as later in the query processing the total amount of data retrieved by the query may be reduced through filtering and aggregation.

Various compression schemes may be applied at the column and/or page level, including multiple dictionary based encoding methods in some embodiments. Some example compression schemes include dictionary coding, in which the dictionary entries are complete data values; prefix coding, in which the dictionary entries are common prefixes of data values; and minus coding, in which the dictionary entries are base values and a given value V is encoded as an offset that is calculated by subtracting from V the dictionary base value that is less than or equal to V, and is the nearest such base value to V. The dictionary coding and prefix coding are general techniques that may be applied to all data types. The minus coding is only applicable to integer-based data types that support arithmetic subtraction.

A compressed code in a data entry may comprise two parts: some number of dictionary bits to indicate the dictionary value that applies to the compressed code, and some number of offset bits that record the remainder of the data value corresponding to the compressed code after removing the common prefix (if prefix coded) or the delta from the base value (if minus coded). In the case of dictionary coding, the number of offset bits is zero. The number of dictionary bits also is zero when the dictionary contains a single value for the column. The encoding is selected such that order is preserved; e.g., if two vales A and B are such that A is less than B, then encode(A) is also less than encode(B) using a suitable less than operation for the values of the data type and integer comparison for the codes. To ensure order preservation of encoded data, the entries in the dictionary are ordered by value.

The code sizes in the dictionary are the number of bits that are required to encode the values, and are not rounded up to the nearest byte or machine word size. A dictionary may be provided for each column, and that dictionary may contain only the values applied to that single column. Column-level compression dictionaries are used in database systems that support column-oriented storage, e.g., in which a page contains the data of one column only, but column dictionaries may also apply to other storage formats, including row-oriented storage and hybrids of column-oriented and row-oriented storage such as column-group storage and partition attributes across (PAX) page layouts.

Multiple code sizes may be used to exploit skew in the data distribution to improve compression. The values of each column dictionary are divided into multiple partitions according to the frequency of the values within the column. The more frequently occurring values are assigned to partitions with shorter code lengths, and less frequent values to partitions with longer codes. The partitioning is done in a way to maximize the resulting compression. The storage page format accommodates the different code sizes and is divided into regions where a given region contains the codes of one size only.

For query processing on data that is compressed with a first-level dictionary, the order-preserving encoding permits range and equality predicates to be evaluated on the encoded data values directly, thus avoiding the requirement to decode the values. Single instruction multiple data (SIMD) is used in the predicate evaluation to process multiple tightly packed, bit-aligned codes of the page using a small number of machine instructions. Joins and groupbys are processed directly on the codes, thus reducing the memory requirements for these computations. Such reduced memory usage permits processing of larger data sets in memory, and to be performed higher in the memory hierarchy for reduced latency and improved performance.

As data is loaded or inserted into the database, the first-level dictionaries are applied to the data values that are stored in a given page. A second-level dictionary may also be constructed for each partition of the first-level dictionary by incrementally adding each data value in the page to the second-level dictionary. All second-level dictionaries that have a smaller code size than their first-level counterparts are then used to further compress the data at the page level. The second-level dictionaries are created such that all of the values in the page that are in the given first-level dictionary partition are fully covered and only smaller code sizes are created at the second level.

The two levels of the dictionary each have the same number of partitions, and there is a 1:1 mapping of a code/value in the second-level to the code/value in the same partition at the first level. In such a hierarchical dictionary data structure, a first-level has some number N of different dictionaries (partitions) for a column, and a second-level has the same number N of partitions, where each implements the same compression scheme as the first-level partition, and is specialized to a local portion of the data (such as a page). The dictionary data structure may implement dictionary coded compression or minus coded compression in various embodiments. In dictionary coded compression, the second level of the data structure contains a dictionary comprising look-up array for which the array index is the second-level code and the array entry is the first-level code. In minus coded compression, the second level may have a different base value and encode a smaller range, using a smaller code size. An uncompressed (uncoded) dictionary partition at the first level may have an encoded dictionary partitions at the second level; the second-level encoding is chosen to be the best of dictionary coded (including prefix coded) and minus coded.

The second-level dictionary is constructed for a load/insert based on the first level, and the second-level compression dictionary state is incrementally maintained for a local portion of the data (such as a page). For a dictionary coded compression, a bit vector records the first-level codes that occur in the local portion of the data. For a minus coded compression, minimum/maximum values that occur in the local portion of the data, such as a page, are tracked. For an uncoded partition, in the first-level dictionary, distinct values in the local portion of the data are tracked using a hash table to determine the compressed code size for dictionary coding the partition; minimum/maximum values in the local portion of the data are tracked to determine the compressed code size for minus coding the partition in the second-level dictionary, and the best of dictionary coded or minus coded is chosen based on which has the smaller code size.

Figure 1A:
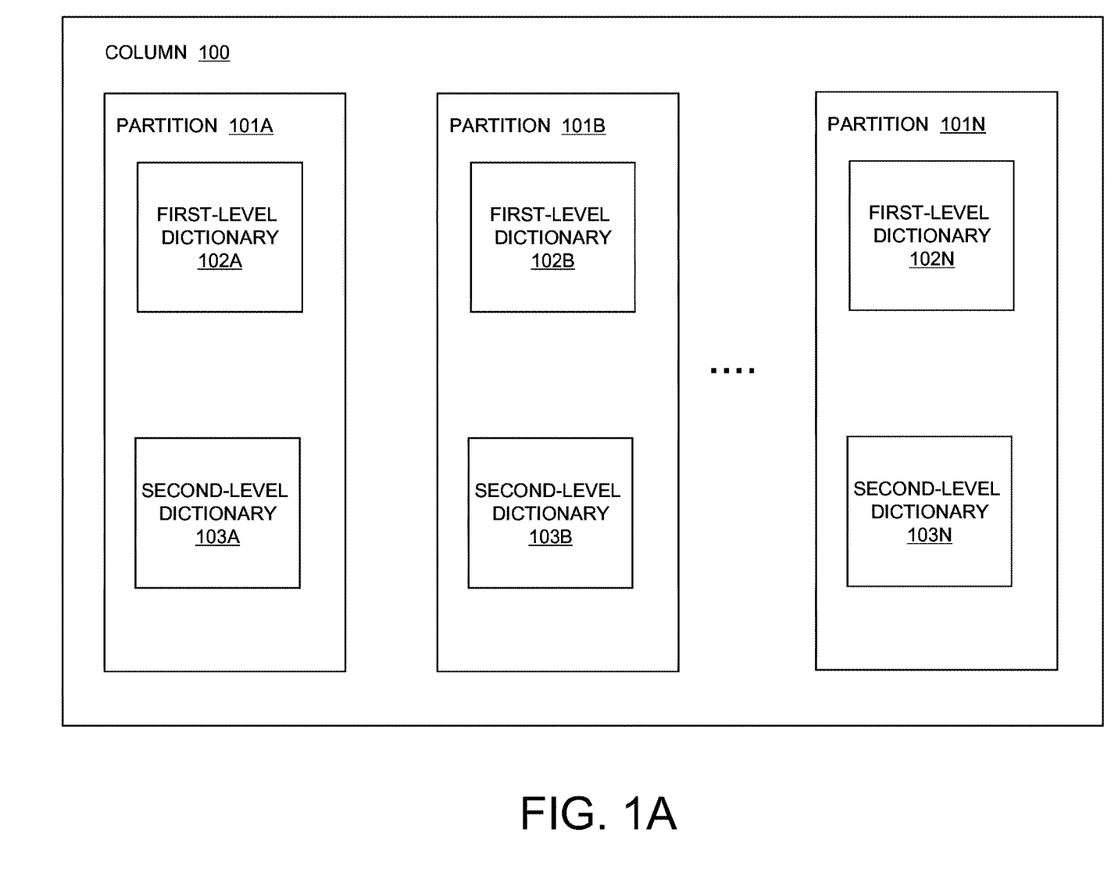
FIG. 1A illustrates an example of hierarchical database compression in accordance with an embodiment.

A column may include multiple partitions in some embodiments, and each partition may be compressed using a different respective compression scheme (i.e., dictionary coded, prefix coded, minus coded); further, a partition of the column may be uncompressed. An example of first-level and second-level dictionaries across multiple partitions is shown in FIG. 1A. Column 100 comprises partitions 101A-101N. Within each partition of partitions 101A-N, the same type of compression (e.g., dictionary, prefix, or minus coding) is used for the partition's respective first-level dictionary 102A-N and second-level dictionary 103A-N. For example, first-level dictionary 102A and second-level dictionary 103A may both be dictionary coded, and first-level dictionary 102B and second-level dictionary 103B may both be minus coded. In this example, first-level dictionary 102A comprises mappings between raw data and first-level codes, and second-level dictionary 103A comprises bidirectional mappings between first-level codes and second-level codes. Further, in this example, first-level dictionary 102B comprises a first base value, and second-level dictionary 103A comprises a second base value that may be different from the first base value. Prefix coding may also be implemented in a partition of partitions 101A-N. FIG. 1A is shown for illustrative purposes only; a column may comprise any appropriate number of partitions in various embodiments. In some embodiments, a partition may have no compression at the first level, and may have a second-level dictionary of any appropriate type of compression. In further embodiments, a partition may be compressed at the first level, and may have a no additional compression at the second level.

For conversion of the first-level codes to the second-level codes to apply the additional second-level compression to a local portion of the data (such as a page), in dictionary coded compression, the second-level dictionary maps from first-level codes to second-level codes for those first-level codes that exist in the local portion of the data. In minus coded compression, the second-level code is equal to first-level code+first-level base value−second-level base value. For predicate evaluation for a given dictionary data structure and the two types of compressions, literals in the predicate are converted to second-level encoding for each local portion of the data that corresponds to the second level. General query processing is enabled on encoded data by code translation from the second level to the first level. In dictionary coded compression, second-level codes are converted to first-level codes via a look-up array in second-level. In minus coded compression, second-level codes are converted to first-level codes by setting the first-level code equal to the second-level code+second-level base value−first-level base value.

Figure 1B:
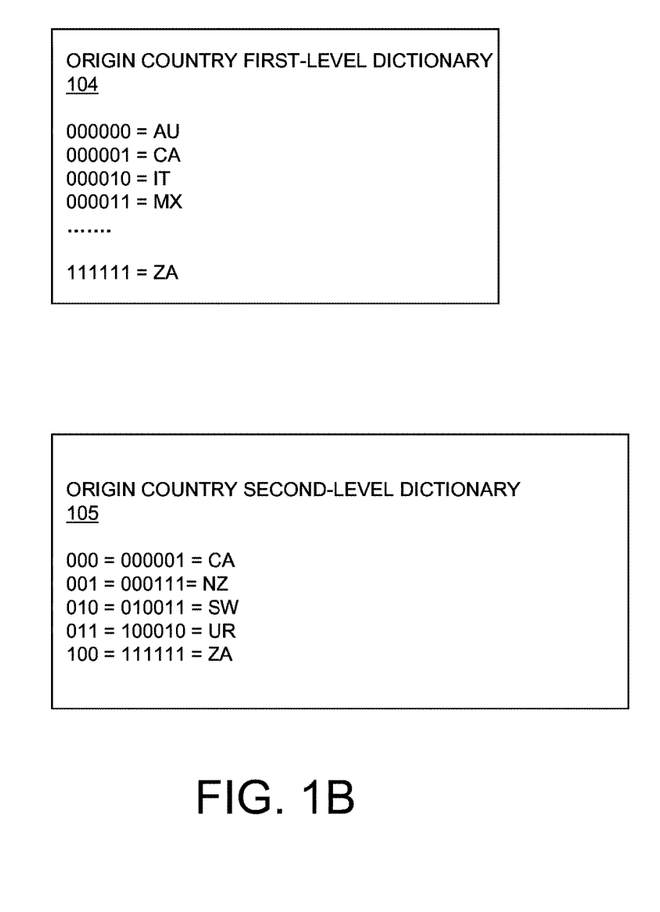
FIG. 1B illustrates an example of a first-level dictionary and a second-level dictionary in accordance with an embodiment.

Various types of dictionary compression may be applied at the second level in various embodiments. The number of dictionary entries for a page or set of pages may be reduced from the first-level dictionary to include dictionary entries that apply to data that is present in the page. The reduced dictionary is stored in the page and contains a mapping from the second-level codes to first-level codes. The second-level dictionary only contains the codes of the first-level dictionary, not the data values and as such, the second-level dictionary benefits from the first-level compression. An example of a first-level dictionary 104 and a reduced second-level dictionary 105 for a dictionary coded partition (for example, partition 101A of FIG. 1) of an origin country column in the table is shown in FIG. 1B. First-level dictionary 104 may correspond to first-level dictionary 102A, and includes 64 values, each represented by a 6-bit code corresponding to a different country. Second-level dictionary 105 may correspond to second-level dictionary 103A, and includes only the 5 distinct country values that occur in the page or set of contiguous pages associated with second-level dictionary 105. Each value in second-level dictionary 105 is represented by a 3-bit code. The mapping between the 3-bit codes in the second-level dictionary 105 and the 6-bit codes in first-level dictionary 104 is included in second-level dictionary 105. Each data entry in the page or set of contiguous pages associated with second-level dictionary 105 therefore only requires 3 bits in the origin country column, thereby reducing the code size of each data entry that is stored in the page and thereby enabling more data entries to be stored in the page. Other types of dictionary compression that may be applied at the second level include reduction in number of bits required to compute offsets given the range of values that occur in the page; and, for the data values that are not compressed at the table level, creating a second-level dictionary that contains the common values, the common prefixes, or a set of base values for minus coding.

Figure 2A:
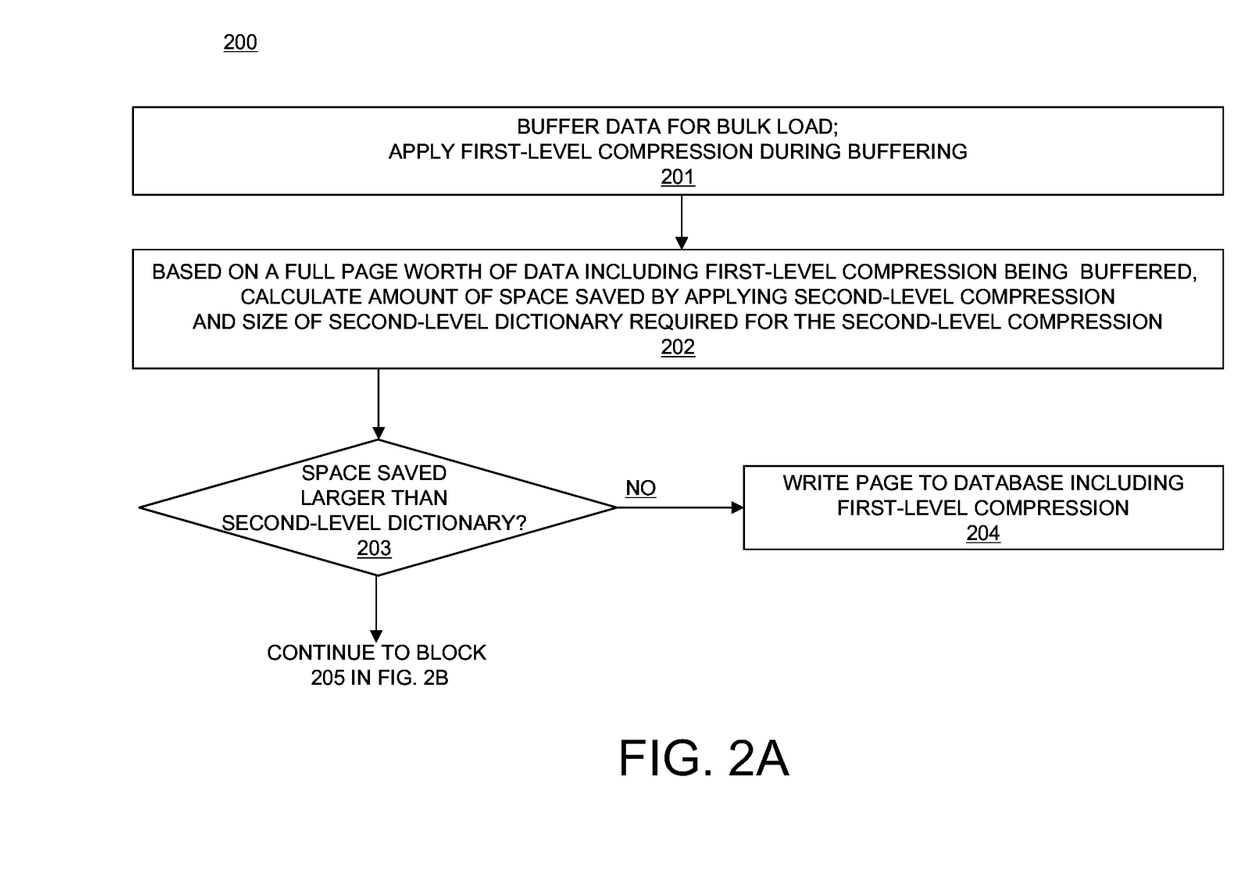
FIGS. 2A-B depict a process flow for a bulk load operation using hierarchical database compression in accordance with an embodiment.
Figure 2B:
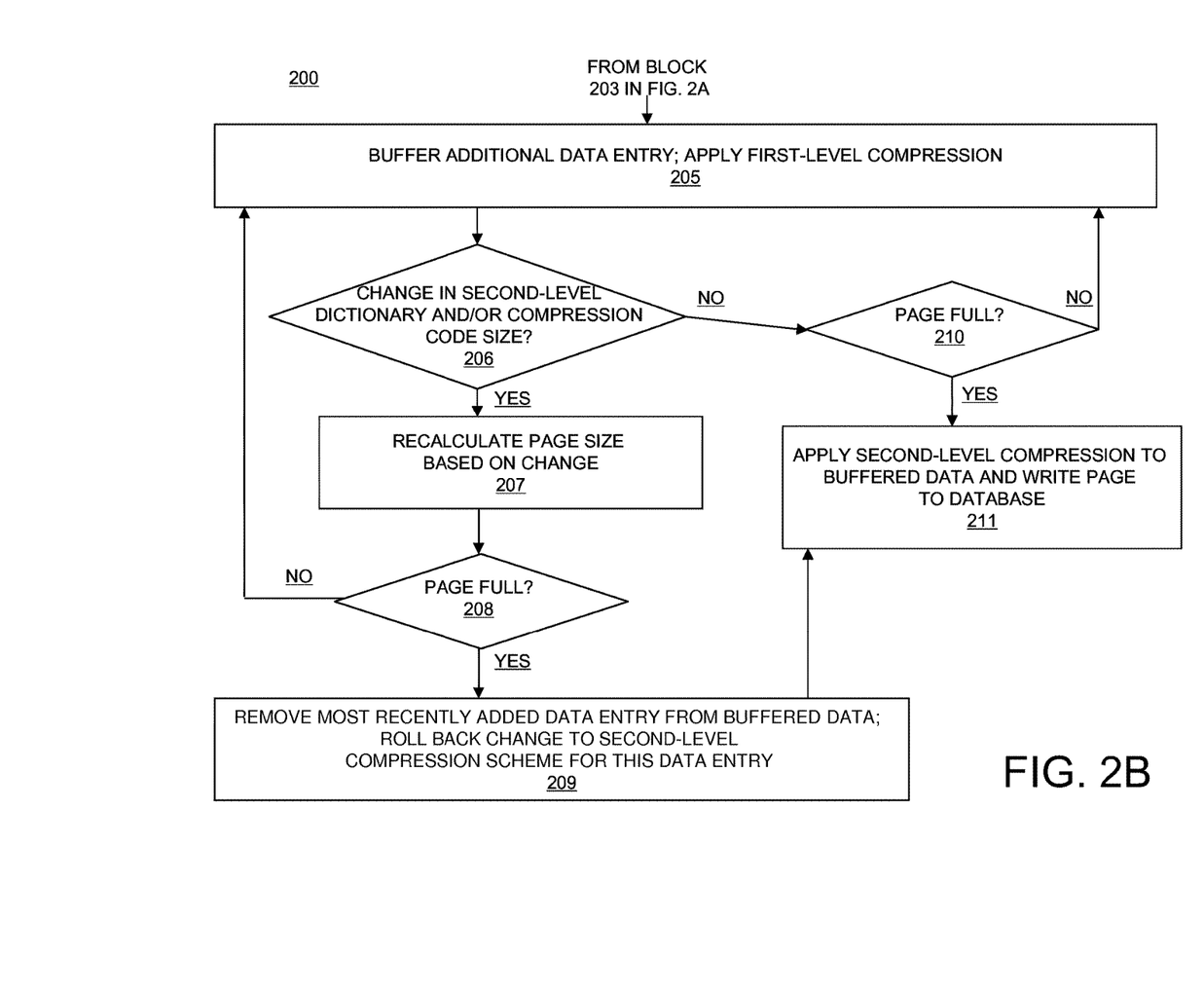

FIGS. 2A-B illustrate an embodiment of a method 200 for a bulk load using hierarchical database compression. First, in block 201 of FIG. 2A, data entries are buffered for the bulk load in a memory buffer. The data entries of the bulk load are part of a single table, and may include one or more columns of the table. First-level compression is applied as the data entries are buffered, and first-level compression codes are stored in the buffer in place of the actual data values in the bulk load data. The buffer memory comprises a memory area that is external to the database. Next, in block 202, it is determined that a full page of data entries, including the first-level compression, is loaded in the buffer, and it is then determined whether application of a second-level compression scheme is beneficial for the buffered data entries. For example, if a column in the buffered data entries contains a relatively small number of distinct values as compared to the number of distinct values in the column of the table, second-level compression may be beneficial for that column. An amount of space saved by application of the second-level compression, and a size of the dictionary required for the second-level compression are also determined in block 202. Flow then proceeds from block 202 to block 203, in which it is determined whether the space saved by the second-level compression that was determined in block 202 is larger than the size of the required second-level dictionary for the second-level compression. If it is determined in block 203 that the space saved by the second-level compression is not larger than the size of the required second-level dictionary, then flow proceeds from block 203 to block 204. For example, if no second-level compression was determined to be applicable to the buffered data in block 202, the space saved and dictionary size would both be zero, and therefore the space saved would not be determined to be larger than the second-level dictionary in block 203. In block 204, the buffered data, including the first-level compression, is written to a page in the database.

If it is determined in block 203 that the space saved by the second-level compression is larger than the size of the required second-level dictionary, flow proceeds from block 203 of FIG. 2A to block 205 of FIG. 2B. In block 205, another data entry, with first-level compression applied, is buffered for the page. Flow then proceeds from block 205 to block 206, in which it is determined whether the most recently added data entry requires a change in the size of the second-level dictionary or the compressed code size, e.g. whether the recently added data entry comprises a new distinct value that was not previously contained in the buffered data. If it is determined in block 206 that the most recently added data entry does not require a change in the size of the second-level dictionary or compression code size, flow proceeds from block 206 to block 210, in which it is determined, based on the current page size of the buffered data with both the first-level compression and the second-level compression applied, whether the page is full. If it is determined in block 206 that the page not full, flow proceeds from block 210 to block 205, and another data entry with first-level compression applied is buffered for the page.

Blocks 205, 206, and 210 repeat until either there is a change in the second-level dictionary or compression code size in block 206, or the page is determined to be full in block 210. In block 206, if it is determined that the most recently added data entry does require a change in the second-level dictionary and/or compression code size, flow proceeds from block 206 to block 207, in which the page size of the buffered data including the table-level compression and the changed second-level compression is determined. Then, in block 208, it is determined based on the page size that was calculated in block 207 whether the page is full. If it is determined in block 208 that the page is not full, the second-level compression scheme is updated to reflect the change that was determined in block 206, and flow proceeds from block 208 back to block 205. However, if it is determined in block 208 that the page is full, flow proceeds from block 208 to block 209. In block 209, the most recently added data entry is removed from the buffered data and the change to the second-level compression scheme that was determined in the most recent execution of block 206, for the removed data entry, is rolled back. Flow then proceeds from block 209 to block 211, in which the rolled-back second-level compression scheme is applied to the buffered data, and the buffered data, including the first-level compression and the second-level compression, and the second-level dictionary are written to a page in the database.

In block 210, if it is determined that the current page size of the buffered data, with both the first-level compression and the second-level compression applied, corresponds to a full page, flow proceeds from block 210 to block 211, in which the buffered data with the first-level and second-level compression applied is written to the database. After completion of block 211, method 200 may repeat, starting at block 201, to buffer a new page. The first buffered entry in the new page is the entry that triggered the full page condition in the previous iteration of method 200. In further embodiments, the same second-level dictionary may be applied to multiple contiguous pages that are created using method 200.

Pages created by a bulk load are not visible to concurrent transactions until the load completes. However, for insert/update operations, the modified pages are available to other transactions when the insert/update transaction commits. Therefore, for an insert/update, buffering data until a full page is created and applying page compression after the data is buffered, as described above with respect to FIG. 2, is not possible. In some embodiments, inserted data that are compressed at the first-level only may be materialized to pages at any point to make the new data available to concurrent queries, and then those pages may be re-compressed later to apply a second level of compression in order to make the buffered data available to concurrent queries.

Various mechanisms may be used to incrementally track the set of data values within the running second-level dictionary state. In some embodiments, a bit vector with one bit per entry of the first-level column partition is used to record which dictionary entries apply to the current page. This bit vector is used to compress the dictionary bits portion of the second-level dictionary encoding. In embodiments in which the partition is minus coded at the first level, the minimum and maximum values of the page may be tracked. The minus coded second-level dictionary is derived by taking the difference between the tracked maximum and minimum values to determine the number of offset bits in the page-level dictionary, where offset bits=ceiling(log2(max−min+1)).

In further embodiments, for values that are not compressed by the first-level dictionary, if a column is minus codeable, then the minimum/maximum values are tracked and used as above to create a minus coded second-level dictionary. In some embodiments, the data values are added to a hash table to find the distinct set of values that occur in the page. The hash table is then used to create a pure dictionary coded second-level dictionary covering the uncompressed values, and the common prefixes of the values in the hash table are determined to create a prefix coded page dictionary. In further embodiments, all three types of page dictionaries (e.g., minus coded, when applicable, pure dictionary coded, and prefix coded) may be tracked and compared and the resulting page dictionary with the smallest code size may be selected for the page.

Figure 3:
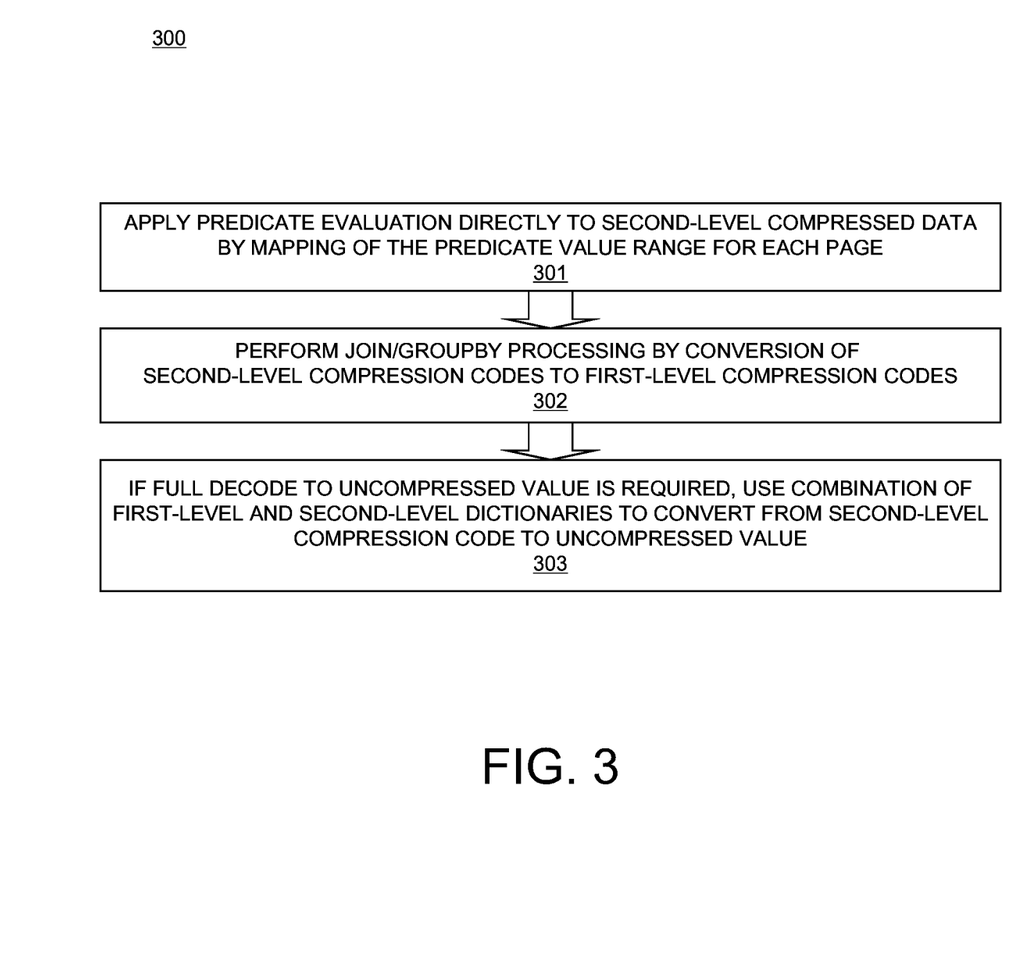
FIG. 3 depicts a process flow for query processing in a database system using hierarchical database compression in accordance with an embodiment.

FIG. 3 shows an embodiment of a method 300 for query processing for a database that implements hierarchical database compression. In block 301, predicate evaluation is applied directly to the second-level compressed data by specializing the mapping of the predicate value range for each page, i.e., the predicate value is encoded using the first-level dictionary and the second-level dictionary and then compared directly to the second-level compressed data. In block 302, join/groupby processing is performed by direct conversion of second-level codes to first-level codes, in order to avoid a full decoding to uncompressed values. In block 303, if a full decode to uncompressed values is required, for example for expression evaluation, a combination of the first-level and second-level dictionaries is used to convert from the second-level code all the way to the uncompressed value.

Figure 4:
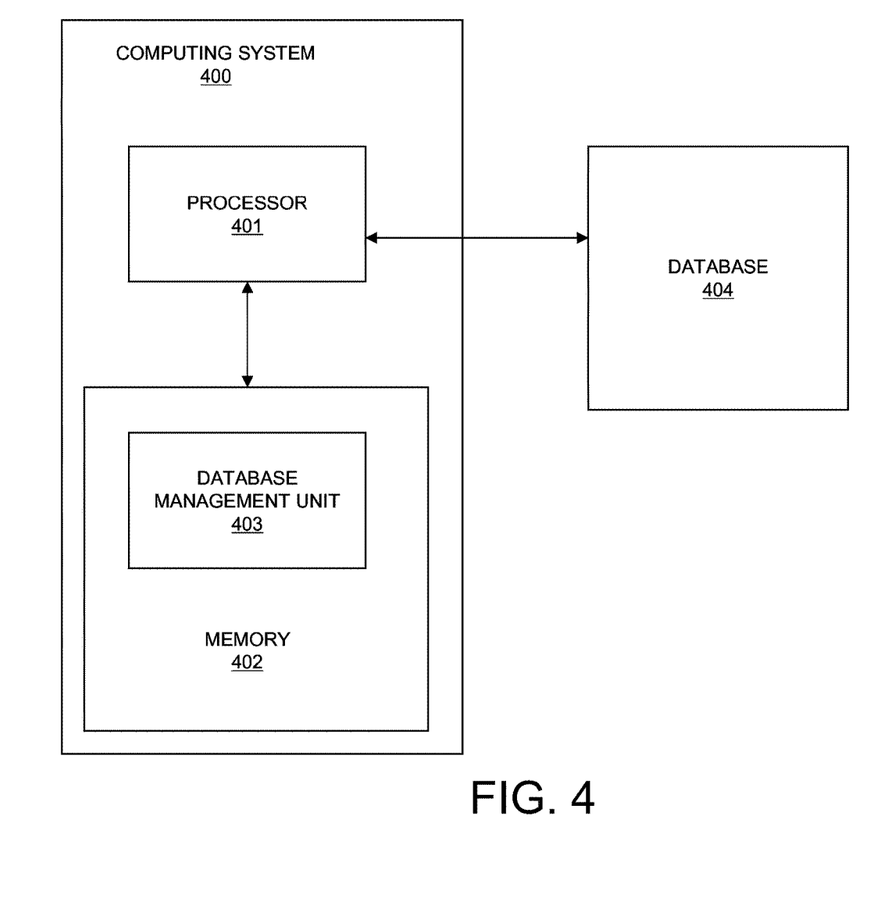
FIG. 4 illustrates a computing system for hierarchical database compression in accordance with an embodiment.

FIG. 4 illustrates an embodiment of a computing system 400 for hierarchical database compression. Computing system 400 includes a processor 401 that is in communication with a memory 402 and a database management unit 403. Computing system 400 is in communication with a database 404, which includes one or more tables that are divided into one or more pages. Database management unit 403 in computing system 400 may implement methods 200 and 300 of FIGS. 2-3 to manage database 404. In some embodiments of implementation of a bulk load according to method 200 of FIG. 2, data entries may be buffered into memory 402.

Figure 5:
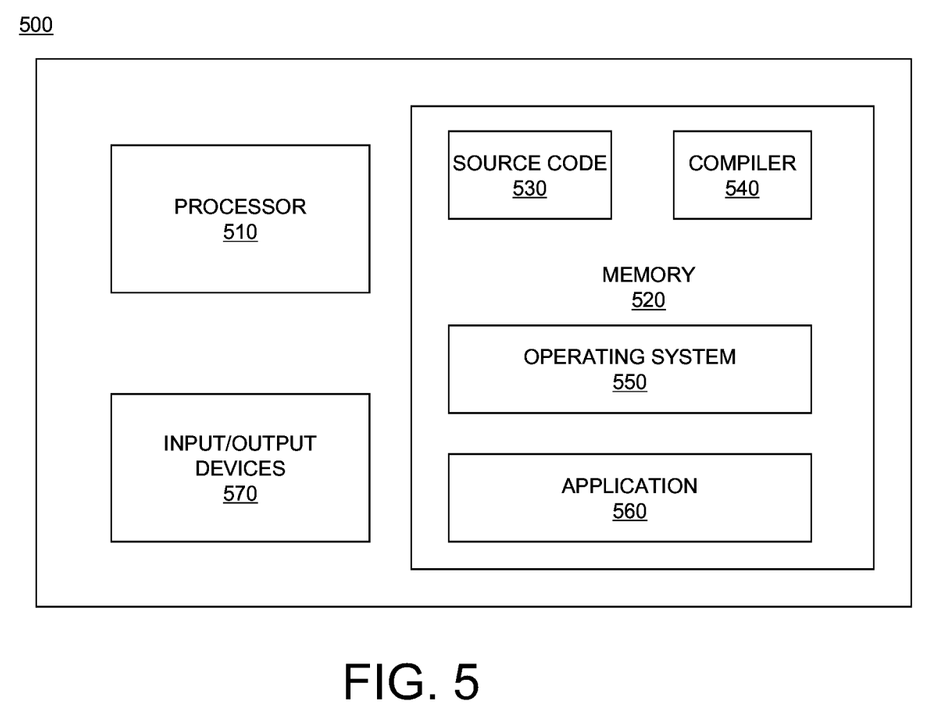
FIG. 5 illustrates a computer system that is used in conjunction with hierarchical database compression in accordance with an embodiment.

FIG. 5 illustrates an example of a computer 500 which may be utilized by exemplary embodiments of page-level database compression. Various operations discussed above may utilize the capabilities of the computer 500. One or more of the capabilities of the computer 500 may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include reduction in memory space required for database storage through application of additional compression to the database, while ensuring good performance of the database.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for hierarchical database compression, comprising:

applying, by a database management unit, a first level of a first type of compression to a first partition of a column of a database and storing data generated from applying the first level of the first type of compression to the first partition in a memory buffer external to the database; and applying, by the database management unit, a second level of the first type of compression to a subset of the data, wherein the first level of the first type of compression comprises a first first-level dictionary and the second level of the first type of compression comprises a first second-level dictionary, and wherein a code size of the first first-level dictionary is larger than a code size of the first second-level dictionary, wherein applying the second level of the first type of compression further comprises:

adding a first data entry to a set of data corresponding to a page of the database;

determining an amount of space saved by applying the second level of the first type of compression to the set of data;

determining a size of the first second-level dictionary corresponding to the first type of compression;

based on determining that the amount of space is larger than the size of the first second-level dictionary, adding a second data entry to the set of data corresponding to the page;

determining, based on the adding of the second data entry to the set of data, that there is a change to at least one of size of the first second-level dictionary and the code size of the first second-level dictionary;

calculating a size of the page based on the determined change;

determining that the page is full based on the calculated size of the page;

removing the second data entry from the set of data corresponding to the page;

applying the second level of the first type of compression without the determined change to the set of data corresponding to the page;

performing predicate evaluation on the subset of the first partition by converting a predicate value into a compressed predicate value using the first first-level dictionary and the first second-level dictionary, and comparing the predicate value directly to compressed data in the subset of the first partition, wherein the compressed data is compressed using the first level and the second level of the first type of compression;

performing join/groupby processing on the subset of the first partition by converting of second-level codes to first-level codes using the first second-level dictionary, and performing the join/groupby processing on the first-level codes; and performing expression evaluation on the subset of the first partition by converting second-level codes to uncompressed data using the first first-level dictionary and the first second-level dictionary.

2. The method of claim 1, further comprising:

applying a first level of a second type of compression to a second partition of the column of the database;

applying a second level of the second type of compression to a subset of the second partition, wherein the first level of the second type of compression comprises a second first-level dictionary and the second level of the second type of compression comprises a second second-level dictionary, and wherein a code size of the second first-level dictionary is larger than a code size of the second second-level dictionary.

3. The method of claim 1, wherein the first type of compression comprises dictionary coding, wherein the first second-level dictionary comprises bidirectional mappings between first-level codes and second-level codes, and wherein:

compressing data in the subset of the first partition comprises converting the data into first-level codes using the first first-level dictionary, and converting the first-level codes into second-level codes using the first second-level dictionary; and wherein decoding data in the subset of the first partition comprises converting second-level codes into first level-codes using the first second-level dictionary, and converting first-level codes into the data using the first first-level dictionary.

4. The method of claim 1, wherein the first type of compression comprises minus coding, and wherein the first first-level dictionary comprises a first base value, and the first second-level dictionary comprises a second base value, wherein the first base value is different from the second base value.

5. The method of claim 1, further comprising a third partition of the column of the database, wherein the third partition is uncoded; and applying a third type of compression to a subset of a third partition of the column of the database, wherein third type of compression comprises one of dictionary coding and minus coding.

6. A computer program product for hierarchical database compression, the computer program product comprising:

a non-transitory computer readable storage medium having program code embodied therewith, the program code executable by a processor to:

apply a first level of a first type of compression to a first partition of a column of a database and store data generated from an application of the first level of the first type of compression to the first partition in a memory buffer external to the database; and apply a second level of the first type of compression to a subset of the data, wherein the first level of the first type of compression comprises a first first-level dictionary and the second level of the first type of compression comprises a first second-level dictionary, and wherein a code size of the first first-level dictionary is larger than a code size of the first second-level dictionary, wherein to apply the second level of the first type of compression further comprises:
adding a first data entry to a set of data corresponding to a page of the database;
determining an amount of space saved by applying the second level of the first type of compression to the set of data;
determining a size of the first second-level dictionary corresponding to the first type of compression;
based on determining that the amount of space is larger than the size of the first second-level dictionary, adding a second data entry to the set of data corresponding to the page;
determining, based on the adding of the second data entry to the set of data, that there is a change to at least one of size of the first second-level dictionary and the code size of the first second-level dictionary;
calculating a size of the page based on the determined change;
determining that the page is full based on the calculated size of the page;
removing the second data entry from the set of data corresponding to the page;
applying the second level of the first type of compression without the determined change to the set of data corresponding to the page;
performing predicate evaluation on the subset of the first partition by converting a predicate value into a compressed predicate value using the first first-level dictionary and the first second-level dictionary, and comparing the predicate value directly to compressed data in the subset of the first partition, wherein the compressed data is compressed using the first level and the second level of the first type of compression;
performing join/groupby processing on the subset of the first partition by converting of second-level codes to first-level codes using the first second-level dictionary, and performing the join/groupby processing on the first-level codes; and
performing expression evaluation on the subset of the first partition by converting second-level codes to uncompressed data using the first first-level dictionary and the first second-level dictionary.

7. The computer program product of claim 6, further comprising:
applying a first level of a second type of compression to a second partition of the column of the database;
applying a second level of the second type of compression to a subset of the second partition, wherein the first level of the second type of compression comprises a second first-level dictionary and the second level of the second type of compression comprises a second second-level dictionary, and wherein a code size of the second first-level dictionary is larger than a code size of the second second-level dictionary.

8. The computer program product of claim 6, wherein the first type of compression comprises dictionary coding, and wherein the first second-level dictionary comprises bidirectional mappings between first-level codes and second-level codes, and wherein:
compressing data in the subset of the first partition comprises converting the data into first-level codes using the first first-level dictionary, and converting the first-level codes into second-level codes using the first second-level dictionary; and
wherein decoding data in the subset of the first partition comprises converting second-level codes into first level-codes using the first second-level dictionary, and converting first-level codes into the data using the first first-level dictionary.

9. The computer program product of claim 6, wherein the first type of compression comprises minus coding, and wherein the first first-level dictionary comprises a first base value, and the first second-level dictionary comprises a second base value, wherein the first base value is different from the second base value.

10. The computer program product of claim 6, further comprising a third partition of the column of the database, wherein the third partition is uncoded; and
applying a third type of compression to a subset of a third partition of the column of the database, wherein third type of compression comprises one of dictionary coding and minus coding.

11. A system for hierarchical database compression comprising:
a database stored in a memory,
the memory having computer readable computer instructions; and
a processor for executing the computer readable instructions, the instructions including:
applying a first level of a first type of compression to a first partition of a column of the database and storing data generated from an application of the first level of the first type of compression to the first partition in a memory buffer external to the database; and
applying a second level of the first type of compression to a subset of the data, wherein the first level of the first type of compression comprises a first first-level dictionary and the second level of the first type of compression comprises a first second-level dictionary, and wherein a code size of the first first-level dictionary is larger than a code size of the first second-level dictionary, wherein applying the second level of the first type of compression further comprises:
adding a first data entry to a set of data corresponding to a page of the database;
determining an amount of space saved by applying the second level of the first type of compression to the set of data;
determining a size of the first second-level dictionary corresponding to the first type of compression;
based on determining that the amount of space is larger than the size of the first second-level dictionary, adding a second data entry to the set of data corresponding to the page;
determining, based on the adding of the second data entry to the set of data, that there is a change to at least one of size of the first second-level dictionary and the code size of the first second-level dictionary;
calculating a size of the page based on the determined change;
determining that the page is full based on the calculated size of the page;
removing the second data entry from the set of data corresponding to the page;
applying the second level of the first type of compression without the determined change to the set of data corresponding to the page;

performing predicate evaluation on the subset of the first partition by converting a predicate value into a compressed predicate value using the first first-level dictionary and the first second-level dictionary, and comparing the predicate value directly to compressed data in the subset of the first partition, wherein the compressed data is compressed using the first level and the second level of the first type of compression;

performing join/groupby processing on the subset of the first partition by converting of second-level codes to first-level codes using the first second-level dictionary, and performing the join/groupby processing on the first-level codes; and performing expression evaluation on the subset of the first partition by converting second-level codes to uncompressed data using the first first-level dictionary and the first second-level dictionary.

12. The system of claim 11, further comprising:

applying a first level of a second type of compression to a second partition of the column of the database;

applying a second level of the second type of compression to a subset of the second partition, wherein the first level of the second type of compression comprises a second first-level dictionary and the second level of the second type of compression comprises a second second-level dictionary, and wherein a code size of the second first-level dictionary is larger than a code size of the second second-level dictionary.

13. The system of claim 11, wherein the first type of compression comprises dictionary coding, and wherein the first second-level dictionary comprises bidirectional mappings between first-level codes and second-level codes, and wherein:

compressing data in the subset of the first partition comprises converting the data into first-level codes using the first first-level dictionary, and converting the first-level codes into second-level codes using the first second-level dictionary; and wherein decoding data in the subset of the first partition comprises converting second-level codes into first level-codes using the first second-level dictionary, and converting first-level codes into the data using the first first-level dictionary.

14. The system of claim 11, wherein the first type of compression comprises minus coding, and wherein the first first-level dictionary comprises a first base value, and the first second-level dictionary comprises a second base value, wherein the first base value is different from the second base value.

15. The system of claim 11, further comprising a third partition of the column of the database, wherein the third partition is uncoded; and applying a third type of compression to a subset of a third partition of the column of the database, wherein third type of compression comprises one of dictionary coding and minus coding.

* * * * *